United States Patent
Walsh et al.

(10) Patent No.: US 8,307,456 B2
(45) Date of Patent: Nov. 6, 2012

(54) SYSTEMS AND METHODS FOR A SECURE GUEST ACCOUNT

(75) Inventors: Daniel J. Walsh, Marlborough, MA (US); Tomas Mraz, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 1013 days.

(21) Appl. No.: 12/039,574

(22) Filed: Feb. 28, 2008

(65) Prior Publication Data
US 2009/0222878 A1    Sep. 3, 2009

(51) Int. Cl.
*G06F 17/30* (2006.01)
(52) U.S. Cl. .............................. 726/28; 726/1
(58) Field of Classification Search ........... 726/1
See application file for complete search history.

(56) References Cited

U.S. PATENT DOCUMENTS

| | | | | |
|---|---|---|---|---|
| 5,923,842 | A * | 7/1999 | Pedersen et al. | 726/8 |
| 7,424,543 | B2 * | 9/2008 | Rice, III | 709/229 |
| 7,437,763 | B2 * | 10/2008 | Guo | 726/25 |
| 7,665,143 | B2 * | 2/2010 | Havens et al. | 726/26 |
| 2004/0230794 | A1 * | 11/2004 | England et al. | 713/164 |
| 2007/0143839 | A1 * | 6/2007 | Chen et al. | 726/17 |
| 2009/0165125 | A1 * | 6/2009 | Brown et al. | 726/21 |
| 2009/0193074 | A1 * | 7/2009 | Lee | 709/203 |

\* cited by examiner

*Primary Examiner* — Kambiz Zand
*Assistant Examiner* — Amare F Tabor
(74) *Attorney, Agent, or Firm* — Lowenstein Sandler PC

(57) ABSTRACT

An embodiment relates generally to a method of creating a secure environment in a computer device. The method includes providing a secure guest account in a multi-user operating system and enforcing a policy on the secure account to allow a user to log-in to the secure guest account while preventing access at least one network port of the computer device. The method also includes enforcing a rule to allow the secure guest account access to an application and the at least one network port.

28 Claims, 4 Drawing Sheets

SYSTEMS AND METHODS FOR A SECURE GUEST ACCOUNT

FIELD

This invention relates generally to guest accounts, more particularly, to systems and methods for a secure guest account in a multi-user secure operating system providing an X-Window system environment.

DESCRIPTION OF THE RELATED ART

In many situations, it would be desirable for a user to login to a computer system, where they have no account to access resources. For example, it would be convenient for a user to log into a guest account at a local public library to conduct research. Other scenarios could be computer kiosks at hotels, shops, airports, tourist stops or restaurants.

However, some operating systems do not provide "guest" account access at all, which restricts users of the system to those users having an account. Other operating systems provide for multiple "guest" accounts, but all the "guest" users share the same execution environment. Shared execution environments prohibit simultaneous execution of all but the most rudimentary programs. Because most programs set up scratch directories, data directories, and home directories, each guest user needs a separate work environment including at least a home directory, a temporary directory, a data directory, and a security context. Current operating systems do not provide "guests" with separate execution environments. Moreover, these guest accounts can be hacked by malicious users to create additional mischief.

BRIEF DESCRIPTION OF THE DRAWINGS

Various features of the embodiments can be more fully appreciated, as the same become better understood with reference to the following detailed description of the embodiments when considered in connection with the accompanying figures, in which.

Figure 1:
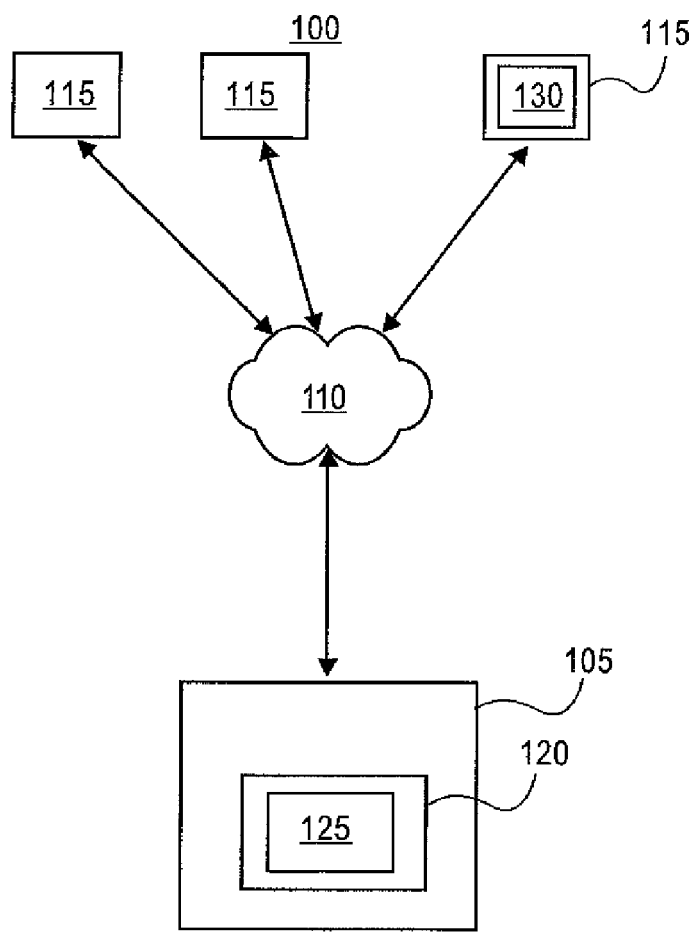
FIG. 1 depicts an exemplary system in accordance with various embodiments.

It will be appreciated that for simplicity and clarity of illustration, elements shown in the drawings have not necessarily been drawn to scale. For example, the dimensions of some of the elements are exaggerated relative to each other. Further, where considered appropriate, reference numbers have been repeated among the drawings to indicate corresponding elements and a repetitive explanation thereof will be omitted.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of secure computer systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to creating a secure guest account for a multi-user secure operating system in public use computing platforms by an operating system. More particularly, a secure operating system, such as SELinux, can be configured to control access to network ports and to prevent non-approved software to be executed in the home directory of the secure guest account. As a result, the secure guest account can be configured to allow a guest user to log in without a password but does not allow any access to network ports and/or use of any privileged applications. The operating system can implement an access rule for the secure guest account that allows the guest user to access a browser application, such as Firefox™, and allow controlled access to the network ports of the computer station and file directory space. The access rule can allow for several modes. One mode can be where a guest user can access the browser application to read local HTML pages and not access the network ports. A second sub-mode can be where a guest user can use the open source browser and have full access to the home directory. A third sub-mode can be configured to allow a guest user of the browser access to the network ports, but the guest user cannot write files to the home directory except in selected directories specified by a system administrator. To add another level of security, the secure operating system can be configured to erase all file/directories created by the guest user during his log-in session. Accordingly, each new person who uses the secure guest account can be guaranteed a clean environment.

The secure guest account can be implemented as a secure guest account policy in a secure operating system such as SELinux™ providing an X-Window system environment. The secure guest account policy can enforce the rule of allowing a guest user to login into the guest account but prevent access of the guest user to the network ports of the computer station. The secure guest account policy can also permit the secure guest account to use a browser application and enforce the sub-modes of the browser as previously described. In some embodiments, a pluggable authentication module ("PAM") can be configured to allow a guest user to login into a Linux account without a password only if SELinux is enabled in an enforcing mode as known to those skilled in the art.

According to various embodiments, since the secure operating system governs the secure guest account, this allows greater control of what application can install and/or execute in the secure guest account as well access to the underlying infrastructure of the computer (network ports, file directory, memory, etc.), The secure operating system providing this control is useful in the case of preventing an executing browser attempting to download any software (useful or malicious) to the underlying machine. As a result, the secure operating system provides a "firewall" against malicious attacks. Moreover, since home directories and temporary directories are removed when the user logs out, the memory resident directories are unmounted and the memory is freed.

This erases out any information left behind the logged out user and will prevent a hacker from leaving a program to attach the next user to use the secure guest account.

FIG. 1 illustrates an exemplary system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 can comprise a secure server 105, a network 110, and clients 115. The secure server 105 can be a server computing platform that provides applications and data to the clients 115 over the network 110. The secure server 105 can be implemented with server products from Dell, Intel, Advanced MicroDevices, Transmeta or other manufacturers of servers as known to those skilled in the art. The secure server 105 can execute a secure operating system 120 like security enhanced Linux ("SELinux") and an X-Window system environment. SELinux is a version of Linux that integrates FLASK architectural components to provide general support for the enforcement of many kinds of mandatory access control policies, including those based on the concepts of type enforcement, role-based access control ("RBAC"), and multi-level security.

The secure server 105 can be coupled to the network 110. The network 110 can be a local area network, a wide area network or combinations thereof implementing network protocols such as TCP/IP, ATM, SONET, or other known network protocols The network 110 can be configured to provide a communication conduit for data, services, and applications to be exchanged between the secure server 105 and the clients 115.

Clients 115 can also be coupled to the network 110 using a network interface such an Ethernet (wireless or wired) card using network protocols such as IEEE802.x. Clients 115 can be implemented as thick clients, thin clients, workstations, personal computers, kiosk, laptops, personal digital assistants, or other mobile devices equipped to interface with an appropriate network protocol compatible with network 110. The clients 115 can also be located in public facilities such as libraries, restaurants, airports, etc. The clients 115 can be configured to log into the secure server 105 over the network 110 with an appropriate authentication protocol. After authentication, the secure server 105 can provide the appropriate services, data, and/or application to the clients 115.

In some embodiments, the secure operating system 120 executing in the secure server 105 can be configured to provide a secure guest account 130 to the clients 115, where a user can log in to the secure guest account 130 without a password and be granted limited access to the Internet. More particularly, a guest account module 125 can be executed in the operating system 120. The guest account module 125 can comprise a policy, a namespace module, and a pluggable authentication module. With these components, the operating system can configure the guest account module 125 to allow a guest user to log in without a password and allow varying degrees of access to network ports and/or use of any privileged applications. Moreover, the guest account module 125 can provide a secure guest account 130 on a client 115 that can erase all file/directories created by the guest user during his log-in session. Accordingly, each new person who uses the secure guest account can be guaranteed a clean environment.

The guest account module 125 can enforce a policy on the secure guest account 130 to permit a guest user to access an application, such as Firefox™, and to permit controlled access to the network ports of the computer station and file directory space. The policy can be configured to provide for several modes on the secure guest account 130. One mode can be where a guest user can access the browser application to read local HTML pages and not access the network ports. A second mode can be a guest user can use the open source browser and have full access to the home directory. A third mode can be configured to allow a guest user of the browser and access to the network ports but the guest user cannot write files to the home directory except in selected directories specified by a system administrator.

Figure 2:
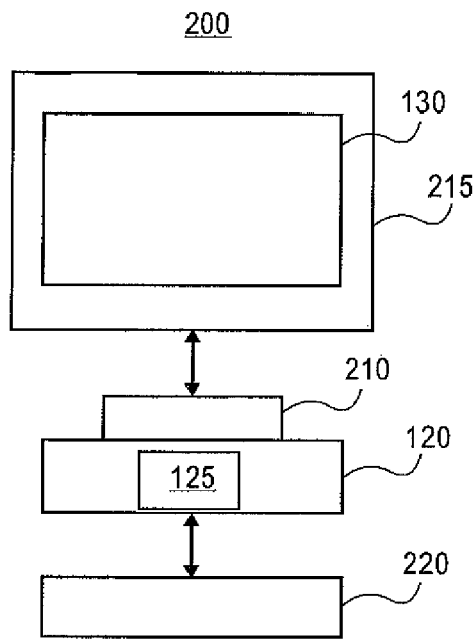
FIG. 2 illustrates an exemplary block diagram of a security component of the secure operating system in accordance with various embodiments.

FIG. 2 illustrates an exemplary software environment 200 in accordance with an embodiment. It should be readily apparent to those of ordinary skill in the art that software environment 200 depicted in FIG. 2 represents a generalized schematic illustration and that other components may be added or existing components may be removed or modified.

As shown in FIG. 2, software environment 200 can include a secure operating system 120 such as SELinux or similar secure multi-tasking, multi-user operating system. A run-time environment (not shown) can be configured to execute on operating system 120. The run-time environment can provide a set of software that supports the execution of applications/programs. The run-time environment can also comprise an application program interface ("API") 210 and a complementary API (not shown) within an application space 215. API 210 can be configured to provide a set of routines that application space 215 uses to request lower-level services performed by the secure operating system 120. The secure operating system 120 can include a kernel (not shown) and device drivers 220. The kernel can be configured to provide secure access to the underlying hardware of a processor through the device drivers 220.

The secure operating system 120 can be configured to execute the guest account module 125. The guest account module 125 can create the secure guest account 130 in application space 215 and enforced by the secure operating system 120. As previously described and in greater detail below, the secure operating system 120 can enforce controls in the secure guest account to prevent access to underlying resources (network ports, file directories, memory, etc.) of the computer as well as removing any temporary home/temporary directories.

Figure 3:
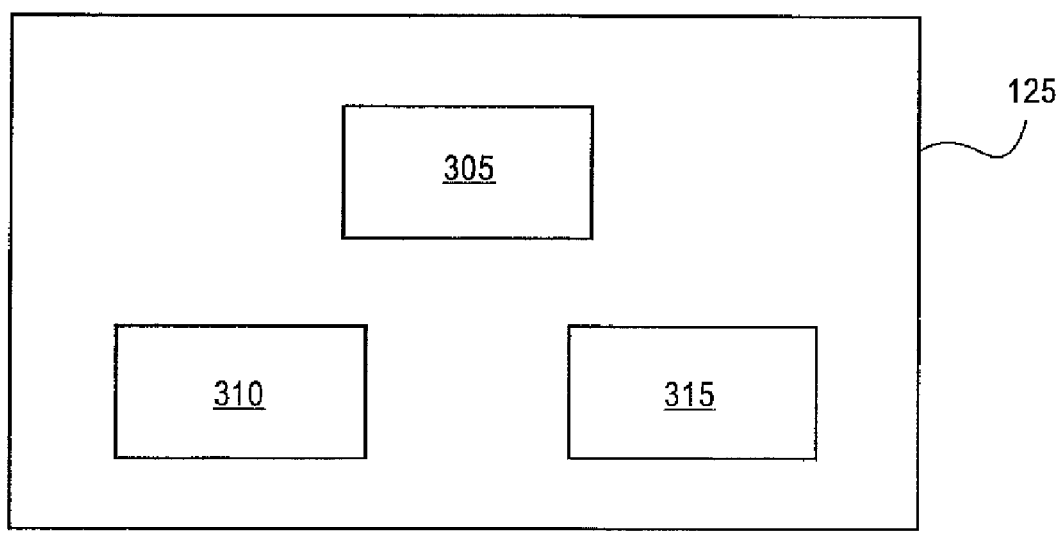
FIG. 3 depicts an exemplary block diagram of a guest account module in accordance with various embodiments.

FIG. 3 shows an exemplary block diagram of the guest account module 125 in accordance with various embodiments. It should be readily apparent to those of ordinary skill in the art that the guest account module 125 depicted in FIG. 3 represents a generalized schematic illustration and that other components may be added or existing components may be removed or modified.

As shown in FIG. 3, the guest account module 125 can comprise of a policy 305, a PAM permit module 310 and a namespace module 315. These components can be incorporated into the secure operating system 120 to implement the functionality of the secure guest account as previously described and in greater detail below.

The policy 305 can be configured to provide several modes of operations for the secure guest account. A first mode can be where a guest user can access the browser application to read local HTML pages and not access the network ports. A second mode can be a guest user can use the open source browser and have full access to the home directory. A third mode can be configured to allow a guest user of the browser and access to the network ports but the guest user cannot write files to the home directory except in selected directories specified by a system administrator.

To implement these modes, the policy 305 can have three flags which can be set by a system administrator. A first flag can be a confinement flag, which indicates whether the secure guest account 125 will transition to an application, such as Firefox™, or not If this flag is set, the secure guest account 125 will be able to browse the Internet using application. If the flag is not set, the secure guest account 125 will only be allowed to run the application locally and no access to the network.

A second flag of the policy 305 can be a guest data flag, which determines whether the application can write to the home directory or not. If this guest data flag is set, the application will be only allowed to write to certain subdirectories of the home directory. In some embodiments, a temporary download directory can be specified. Table I illustrates an embodiment of creating a temporary download directory

TABLE I semanage fcontext -a -t xguest_mozilla_home_t /home/
xguest/Download(/.*)?
restorecon -R -v ~/xguest A third flag of the policy 305 can be a guest content flag, which determines whether the secure guest account 125 can execute files in its home directory or /tmp. If this flag is set, the secure guest account 125 can execute files. Otherwise, the secure guest account 1 is not allowed to execute files. This can prevent some forms of attack on users The PAM permit module 310 of the guest account module 125 can be configured to allow access to the secure guest account. If the SELinux is in enforcing mode, the PAM permit module 310 can allow the user to log into the secure guest account without a password. Otherwise, if the SELinux in not set in enforcing mode, the PAM permit module 310 can prevent access to the secure guest account. The PAM permit module 310 can also enforce that the only access to the secure guest account is through "xdm". Otherwise, any attempts at logging into the secure guest account will fail as well as services such as remote login, sshd, rshd, or telnetd.

Table II illustrates an embodiment of the PAM permit module 310.

TABLE II

```
# useradd -Z xguest_u xguest
# cat /etc/pam.d/gdm
#%PAM-1.0
auth        [success=done ignore=ignore default=bad]
pam_selinux_permit.so
auth    required    pam_env.so
auth    include     system-auth
auth    optional    pam_gnome_keyring.so auto_start
account required    pam_nologin.so
account include     system-auth
...
session required    pam_selinux.so open
session required    pam_namespace.so
session optional    pam_gnome_keyring.so
```

The namespace module 315 can be configured to provide temporary directories for the secure guest account 125. More particularly, the namespace module 315 can provide a temporary home directory (Homedir), file directory (/tmp) and /var/tmp when the guest user logs in. When the guest user logs out, the temporary files and/or directories are removed. Accordingly, a new guest user is guaranteed a clean environment. In some instances, the namespace module 315 can allow a designation of a temporary download directory for the guest user.

To incorporate this functionality, namespace module 315 has to be added to /etc/init.d/gdm as shown in Table II. Table III illustrates additional code to fully utilize the namespace module 315 into the secure operating system 120.

TABLE III

| /tmp | tmpfs tmpfs ~xguest |
| /var/tmp | tmpfs tmpfs ~xguest |
| $HOME | tmpfs tmpfs ~xguest |

Figure 4:
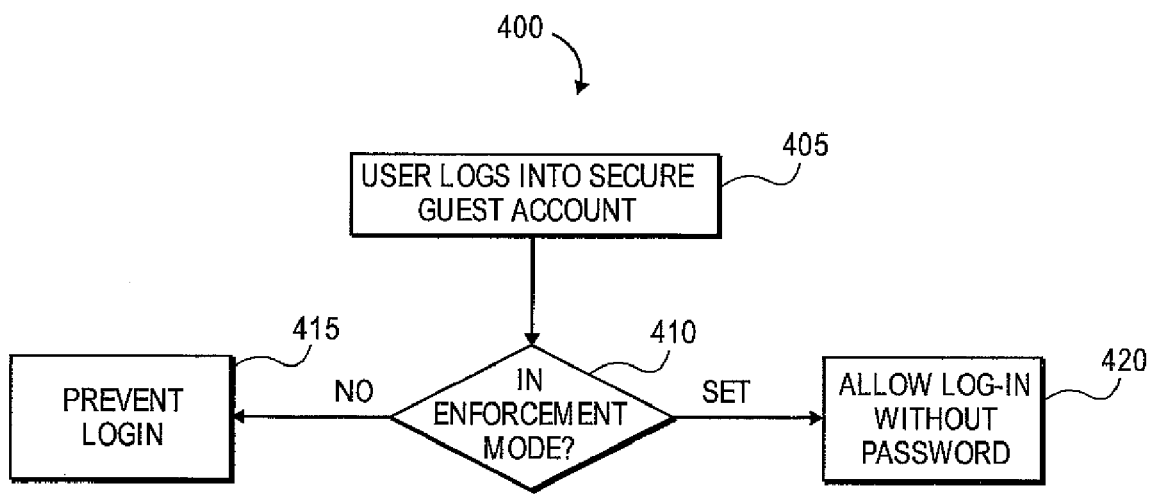
FIG. 4 depicts an exemplary flow diagram in accordance with various embodiments.

FIG. 4 illustrates an exemplary flow diagram 400 executed by the PAM permit module 410. It should be readily apparent to those of ordinary skill in the art that the flow diagram 400 depicted in FIG. 4 represents a generalized schematic illustration and that other steps may be added or existing steps may be removed or modified.

As shown in FIG. 4, the PAM permit module 310 can be configured to detect a user attempting to logging into the secure guest account 125, in step 405. The PAM permit module 310 can be configured to determine whether the secure operating system 120, e.g., SELinux™, is an enforcing mode, in step 410. If the secure operating system 120 is not in enforcing mode, the PAM permit module 310 prevents the user from logging into the secure guest account, in step 415. Otherwise, if the secure operating system 120 is set in enforcing mode, the PAM permit module 310 can allow the user to log into the secure guest account 125, in step 420.

Figure 5:
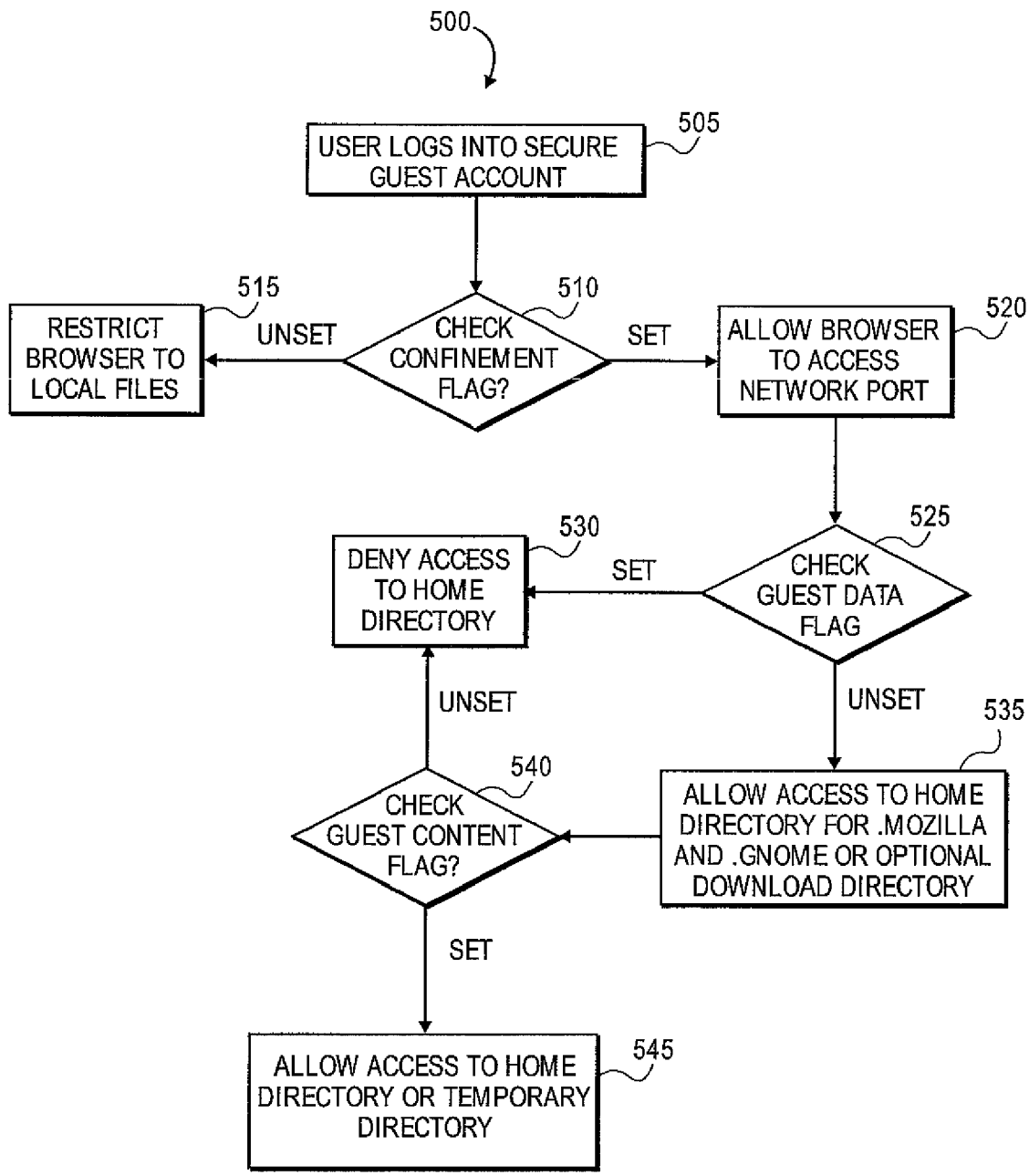
FIG. 5 depicts another exemplary flow diagram in accordance with various embodiments.

FIG. 5 depicts an exemplary flow diagram 500 for the policy 305 in accordance with various embodiments. It should be readily apparent to those of ordinary skill in the art that the flow diagram 500 depicted in FIG. 5 represents a generalized schematic illustration and that other steps may be added or existing steps may be removed or modified.

As shown in FIG. 5, the policy 305 can be initiated when the user logs into the secure guest account 125, in step 505. The policy 305 can be configured to determine whether the confinement flag has been set, in step 510. If the confinement flag is not set, the application, e.g., a browser application, can be restricted to reading local files and granted no access to the network ports of the underlying client 115, in step 515. Otherwise, if the confinement flag is set, the application will be granted access to the network port(s) of the underlying client 115, in step 520.

In step 525, the policy 305 can be configured to determine whether the guest data flag has been set. If the flag is set, the secure guest account 125 cannot access its associated home directory of secure guest account 125, in step 530. Otherwise, if the guest data flag is unset, the secure guest account 130 is allowed to certain subdirectories (e.g., .mozilla and .gnome) of the home directory or a temporary download directory, in step 535.

In step 540, the policy 305 can be configured to determine whether the guest content flag has been set. If the guest content flag has not been set, the secure guest account 130 is denied access to the home directory for execution of files, in step 535. Otherwise, if the guest content flag is set, the secure guest account 125 can be granted access to the home directory or a temporary directory for file execution, in step 545.

Figure 6:
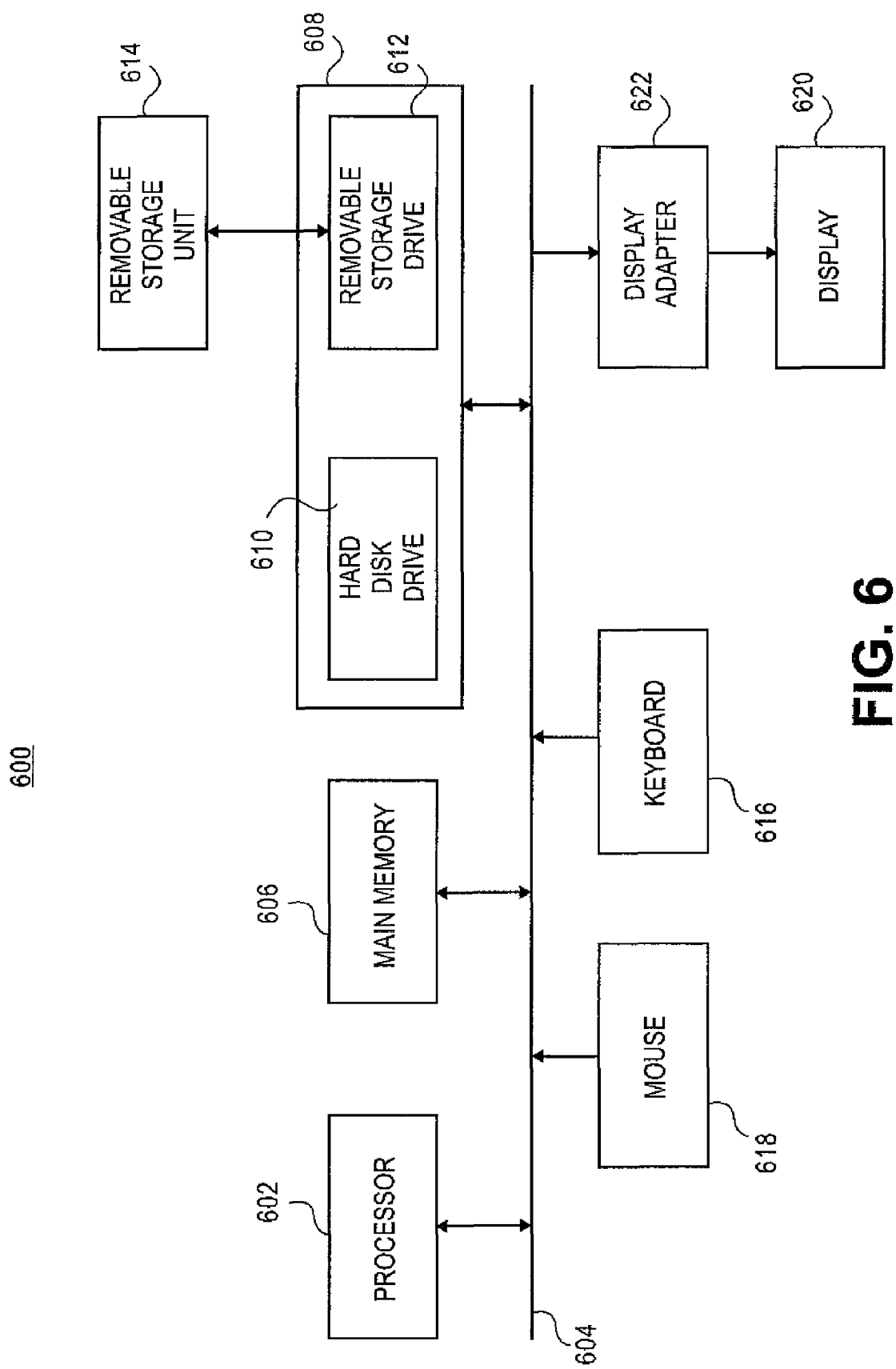
FIG. 6 illustrates an exemplary computing platform in accordance with various embodiment.

FIG. 6 illustrates an exemplary block diagram of a computing platform 600 where an embodiment may be practiced. The functions of the guest account module 125 may be implemented in program code and executed by the computing platform 600. The guest account module 125 may be implemented in computer languages such as PASCAL, C, C++, JAVA, etc.

As shown in FIG. 6, the computer system 600 includes one or more processors, such as processor 602 that provide an execution platform for embodiments of the guest account module 125. Commands and data from the processor 602 are communicated over a communication bus 604. The computer system 600 also includes a main memory 606, such as a Random Access Memory (RAM), where the guest account module 125 may be executed during runtime, and a secondary memory 608. The secondary memory 608 includes, for example, a hard disk drive 610 and/or a removable storage drive 612, representing a floppy diskette drive, a magnetic tape drive, a compact disk drive, etc., where a copy of a computer program embodiment for the guest account module 125 may be stored. The removable storage drive 612 reads from and/or writes to a removable storage unit 614 in a well-known manner. A user interfaces with the guest account module 125 with a keyboard 616, a mouse 618, and a display 620. The display adapter 622 interfaces with the communication bus 604 and the display 620. The display adapter 622 also receives display data from the processor 602 and converts the display data into display commands for the display 620.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
providing a plurality of guest accounts in an operating system of a computing device, each of the plurality of guest accounts configured to allow a user without a dedicated user account on the operating system access to the operating system;
allowing, by the operating system, a user to log-in to a guest account of the plurality of guest accounts;
creating a temporary space to store at least one of a file or a directory created by the user logging into the guest account;
preventing, by the operating system while the user is logged into the guest account, applications and processes associated with the guest account access to at least one network port of the computing device;
providing, by the operating system while the user is logged into the guest account, a plurality of modes of operation of the guest account, wherein each mode of operation implements a different level of security for the guest account; and
deleting the temporary space in response to the user logging out of the guest account.

2. The method of claim 1, wherein the rule further comprises setting a flag that allows an application to execute and access the at least one network port.

3. The method of claim 2, wherein if the flag is not set the application runs locally on the computing device and access the at least one network port is blocked.

4. The method of claim 1, wherein the rule further comprises a flag that at least one of allows or prevents an application to write to a home directory.

5. The method of claim 1, further comprising providing for a download directory for the guest account.

6. The method of claim 1, wherein the rule further comprises a flag that at least one of allows or prevents an application to execute in a home directory or a temporary directory.

7. The method of claim 1, further comprising:
providing for a permit module configured to determine access to the guest account; and
setting the permit module to prevent log-in into the guest account.

8. The method of claim 1, further comprising:
providing for a permit module configured to determine access to the guest account; and
setting the permit module to allow log-in into the guest account.

9. The method of claim 7, wherein the operating system is SELinux™.

10. The method of claim 7, wherein the application is a web-browser application.

11. A method comprising:
implementing, by an operating system of a computing device, a policy permitting a user to log-in to a guest account that is configured to allow a user without a dedicated user account on the operating system access to the operating system;
preventing, as part of implementing the policy, applications and processes associated with the guest account access to at least one network port of the computing device while the user is logged into the guest account;
implementing, by the operating system, a rule that allows the guest account access to an application and the at least one network port;
instantiating, by the operating system, the guest account on the computing device;
creating a temporary space for at least one of a files or a directory created by the user logging into the guest account;
providing, by the operating system while the user is logged into the guest account, a plurality of modes of operation of the guest account, wherein each mode of operation implements a different level of security for the guest account; and
deleting the temporary space in response to the user logging out of the guest account.

12. The method of claim 11, wherein the rule further comprises setting a flag that allows an application to execute and access the at least one network port.

13. The method of claim 12, wherein if the flag is not set the application runs locally on the computing device and access the at least one network port is blocked.

14. The method of claim 11, wherein the rule further comprises a flag that at least one of allows or prevents an application to write to a home directory.

15. The method of claim 11, further comprising: providing for a download directory for the guest account.

16. The method of claim 11, wherein the rule further comprises a flag that at least one of allows or prevents an application to execute in a home directory or a temporary directory.

17. A system comprising:
a memory;
a processing device communicably coupled to the memory, the processing device to execute a guest account module from the memory, the guest account module configured to:
provide a plurality of guest accounts in an operating system executable from the memory by the processing device, each of the plurality of guest accounts configured to allow a user without a dedicated user account on the operating system access to the operating system;
allow, by the operating system, a user to log-in to a guest account of the plurality of guest accounts;
create a temporary space for at least one of a file or a directory created by the user logging into the guest account;
prevent, by the operating system while the user is logged into the guest account, applications and processes associated with the guest account access to at least one network port;
provide, by the operating system while the user is logged into the guest account, a plurality of modes of operation of the guest account, wherein each mode of operation implements a different level of security for the guest account; and
delete the temporary space in response to the user logging out of the guest account.

18. The system of claim 17, wherein the rule further comprises setting a flag that allows an application to execute and access the at least one network port.

19. The system of claim 18, wherein if the flag is not set the application runs locally on the computing device and access the at least one network port is blocked.

20. The system of claim 17, wherein the rule further comprises a flag that at least one of allows or prevents an application to write to a home directory.

21. The system of claim 17, wherein the guest account module is further configured to provide for a download directory for the guest account.

22. The system of claim 17, wherein the rule further comprises a flag that at least one of allows or prevents an application to execute in a home directory or a temporary directory.

23. A non-transitory machine-readable storage medium including data that, when accessed by a machine, cause the machine to perform operations comprising:
providing a plurality of guest accounts in an operating system of a computing device, each of the plurality of guest accounts configured to allow a user without a dedicated user account on the operating system access to the operating system;
allowing, by the operating system, a user to log-in to a guest account of the plurality of guest accounts;
creating a temporary space for at least one of a file or a directory created by the user logging into the guest account;
preventing, by the operating system while the user is logged into the guest account, applications and processes associated with the guest account access to at least one network port of the computing device;
providing, by the operating system while the user is logged into the guest account, a plurality of modes of operation of the guest account, wherein each mode of operation implements a different level of security for the guest; and
deleting the temporary space in response to the user logging out of the guest account.

24. The non-transitory machine-readable storage medium claim 23, wherein the rule further comprises setting a flag that allows an application to execute and access the at least one network port.

25. The non-transitory machine-readable storage medium claim 23, wherein if the flag is not set the application runs locally on the computing device and access the at least one network port is blocked.

26. The non-transitory machine-readable storage medium claim 23, wherein the rule further comprises a flag that at least one of allows or prevents an application to write to a home directory.

27. The non-transitory machine-readable storage medium claim 23, wherein the data, when accessed by the machine, causes the machine to perform further operations comprising:
providing for a permit module configured to determine access to the guest account; and
setting the permit module to prevent log-in into the guest account.

28. The non-transitory machine-readable storage medium claim 23, wherein the data, when accessed by the machine, causes the machine to perform further operations comprising:
providing for a permit module configured to determine access to the guest account; and
setting the permit module to allow log-in into the guest account.

* * * * *